(12) United States Patent
Cormier

(10) Patent No.: US 8,979,457 B2
(45) Date of Patent: Mar. 17, 2015

(54) DEVICE FOR FASTENING

(75) Inventor: Arnaud Cormier, Le Mans (FR)

(73) Assignee: Alcoa Fixations Simmonds SAS, Saint-Cosme-en-Vairais (FR)

( * ) Notice: Subject to any disclaimer, the term of this patent is extended or adjusted under 35 U.S.C. 154(b) by 770 days.

(21) Appl. No.: 13/217,438

(22) Filed: Aug. 25, 2011

(65) Prior Publication Data

US 2012/0051870 A1 Mar. 1, 2012

(30) Foreign Application Priority Data

Aug. 25, 2010 (FR) ...................................... 10 56752

(51) Int. Cl.
*F16B 39/10* (2006.01)
*F16B 39/284* (2006.01)

(52) U.S. Cl.
CPC ................ *F16B 39/10* (2013.01); *F16B 39/284* (2013.01)
USPC ........................................................ 411/204

(58) Field of Classification Search
CPC .......... F16B 39/04; F16B 39/06; F16B 39/10; F16B 39/32; F16B 39/36; F16B 39/14; F16B 39/20; F16B 30/08; F16B 39/282; F16B 39/08; F16B 39/108; F16B 39/24; F16B 39/02; F16B 31/04; F16B 5/0208; F16B 19/1045; F16B 19/005; F16B 43/00; B25B 13/48; B25B 13/485; B25B 13/488; E01B 9/10; E01B 9/16; A62B 9/022; B23P 9/025; B21K 25/00; B25D 9/16; B60G 11/12; B60Q 1/2611; B21D 53/20; B60R 13/105; B60S 1/18; E03D 11/16

USPC ......... 411/209–211, 204, 216, 321, 315, 119, 411/120, 132, 143, 144, 147, 152

See application file for complete search history.

(56) References Cited

U.S. PATENT DOCUMENTS

| | | | | | |
|---|---|---|---|---|---|
| 1,022,657 | A | * | 4/1912 | Buttner | 411/211 |
| 1,081,232 | A | * | 12/1913 | Hughes | 411/144 |
| 1,367,985 | A | * | 2/1921 | Nainka | 411/120 |
| 1,431,459 | A | * | 10/1922 | Hardie | 411/221 |
| 2,013,526 | A | * | 9/1935 | Schmitt | 411/198 |
| 2,136,155 | A | * | 11/1938 | Spicacci | 411/517 |
| 2,370,944 | A | * | 3/1945 | Emerson | 411/119 |
| 2,880,637 | A | * | 4/1959 | Koenig | 81/10 |
| 3,318,355 | A | * | 5/1967 | Dwyer | 411/313 |
| 3,727,969 | A | * | 4/1973 | Eddy et al. | 411/96 |
| 4,176,786 | A | * | 12/1979 | Braukmann | 411/919 |
| 4,432,680 | A | * | 2/1984 | Molina | 411/103 |
| 5,967,724 | A | * | 10/1999 | Terry | 411/149 |
| 6,471,457 | B2 | * | 10/2002 | Nago | 411/121 |
| 6,880,433 | B1 | * | 4/2005 | Tanimura | 411/119 |

(Continued)

FOREIGN PATENT DOCUMENTS

| | | |
|---|---|---|
| EP | 1 471 269 A2 * | 10/2004 |
| FR | 2 854 213 A1 | 10/2004 |

*Primary Examiner* — Gay Ann Spahn
(74) *Attorney, Agent, or Firm* — Young & Thompson

(57) ABSTRACT

A device for fastening includes a threaded rod, a nut that can be screwed on the rod and elements for locking the nut in rotation in relation to the threaded rod including an intermediary ring mounted between a skirt of the nut and an end of the threaded rod, this ring including rotational coupling elements with the end of the threaded rod and rotational coupling elements with the skirt of the nut. The nut is elastically deformable to tightening during the screwing on the threaded rod.

11 Claims, 3 Drawing Sheets

(56) References Cited

U.S. PATENT DOCUMENTS

| | | |
|---|---|---|
| 7,189,044 B2 * | 3/2007 | Ball ............................ 411/329 |
| 7,927,052 B1 * | 4/2011 | Varden ......................... 411/221 |
| 7,955,037 B2 * | 6/2011 | Disantis et al. ............... 411/330 |
| 8,496,422 B2 * | 7/2013 | Senaluck et al. .............. 411/318 |
| 2002/0037205 A1 * | 3/2002 | Taneichi ....................... 411/267 |
| 2009/0136294 A1 * | 5/2009 | Porter et al. ..................... 411/5 |
| 2011/0291468 A1 * | 12/2011 | Rieger et al. .................. 411/209 |
| 2014/0140787 A1 * | 5/2014 | Gignoux et al. .............. 411/216 |

\* cited by examiner

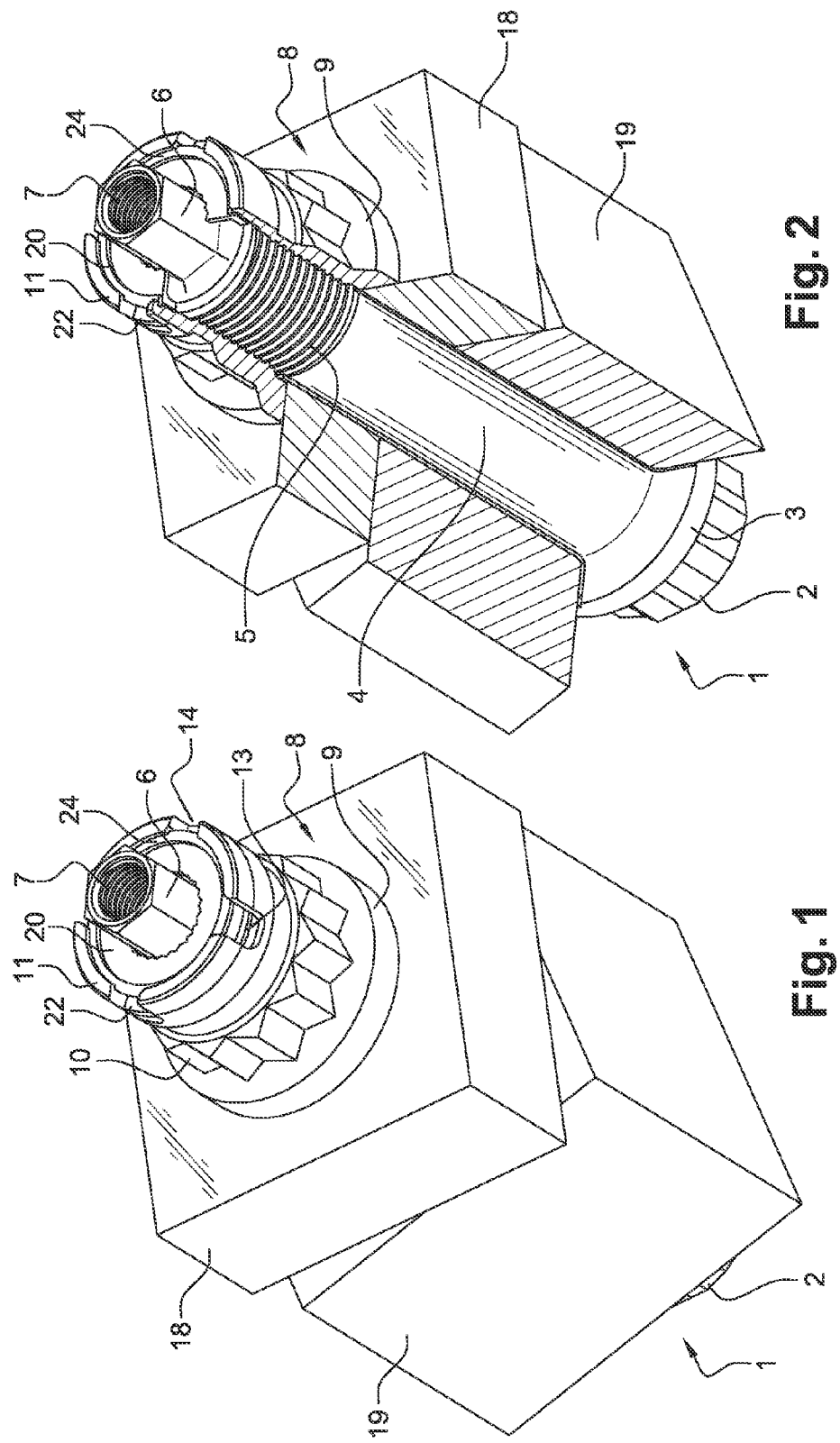

DEVICE FOR FASTENING

FIELD AND BACKGROUND OF THE INVENTION

This invention relates to a device for fastening, intended in particular for the aeronautics field.

In such a field, it is particularly important to ensure the proper fastening of the various elements. During the flight of an aircraft, the vibrations generated can cause a nut to become loose, causing a relative harmful movement between the elements to be fastened, and even the disconnecting thereof.

In order to prevent this, FR 2 854 213, in the name of the Applicant, proposes a device for fastening comprising a threaded rod, a nut that can be screwed on the rod and means for locking the nut in rotation in relation to the threaded rod comprising an intermediary ring mounted between the nut and an end of the threaded rod. This ring comprises rotational coupling means with the end of the threaded rod and rotational coupling means with the nut.

Such a device makes it possible to prevent in a relatively sure manner any rotation of the nut in relation to the threaded rod, and therefore a loosening of this nut under the effect of the vibrations.

It is suitable to further improve the safety of the assemblies and of the fastenings, in particular in the field of aeronautics.

SUMMARY OF THE INVENTION

The invention has in particular for objective to provide a solution simple, effective and economical solution to this problem.

To this effect, it propose a device for fastening comprising a threaded rod, a nut that can be screwed on the rod and means for locking the nut in rotation in relation to the threaded rod comprising an intermediary ring mounted between the nut and an end of the threaded rod, this ring comprising rotational coupling means with the end of the threaded rod and rotational coupling means with the nut, wherein the nut comprises a thinned portion which is elastically deformable to tightening at the end of screwing on the threaded rod and in that the intermediary ring is mounted and immobilized in rotation in said skirt by the aforementioned coupling means.

The elastic deformation of the thinned portion of the nut which is carried out according to the invention during the screwing, forms a brake that opposes the loosening of the nut under the effect of the external forces.

The elastic deformation of the thinned portion makes it possible to obtain a constant pressure on the threading of the screw during the tightening.

In a preferred embodiment of the invention, the thinned portion of the nut is a cylindrical skirt which extends axially from the nut.

This skirt can for example have a zone of a smaller section, for example via prior plastic deformation, which will be widened by force during the screwing.

The threading can also comprise a zone wherein the pitch is reduced, with the forcing of the threaded rod in the threading making it possible to deform the thread and as such guarantee the braking during the screwing.

Advantageously, the end of the threaded rod comprises at least one longitudinal protruding ridge, with the radially internal edge of the ring being provided with a plurality of teeth or catches that can engage with this longitudinal ridge and define a plurality of angular positions of the ring around the end of the threaded rod.

According to another feature of the invention, the end of the threaded rod is an axial rod of reduced diameter, with polygonal external section, for example hexagonal.

This section can also be of the bi-hexagonal type or of any other appropriate shape that makes it possible to prevent the rotation of the threaded rod or of the screw during the screwing of the nut.

The radially external edge of the ring can comprise at least one lug extending radially towards the exterior, which can be engaged in at least one notch of the skirt of the nut.

More particularly, the radially external edge of the ring can comprise at least two radial lugs extending diametrically opposite each other.

Preferably, the skirt of the nut comprises at least two notches offset angularly in relation to one another by a value corresponding to an integer of pitches between two teeth or between two catches, increased by approximately one half pitch.

In this way, for the same angular position of the nut in relation to the threaded rod, the possibilities of assembling the ring are doubled. As is indicated hereinafter, assembly clearances between the ring on the one hand and the skirt of the nut or the threaded rod on the other hand, can make it possible to absorb angular offsets less than one half pitch. As such, regardless of the position of the nut in relation to the threaded rod, the assembly of the ring is always possible.

In an alternative embodiment of the invention, the nut comprises at least three notches, respectively a first and a second notches offset angularly in relation to one another by a value corresponding to an integer of pitches between two teeth or between two catches, increased by approximately one half pitch, and a third notch offset angularly from the first notch by a value corresponding to an integer of pitches between two teeth or between two catches, increased by approximately a quarter of a pitch or by three-quarters of a pitch.

The possibilities for assembly are as such further increased. In the same way as previously, the assembly clearances between the ring on the one hand and the skirt of the nut or the threaded rod on the other hand, make it possible to absorb angular offsets less than a quarter of a pitch.

Advantageously, the rotational coupling means with the nut and/or the rotational coupling means with the threaded rod comprise an assembly clearance authorizing the assembly of the ring between the nut and the threaded rod, regardless of their positions.

Preferentially, the device comprises means of axial retaining of the ring inside the skirt.

The means of axial retaining can comprise a split elastic ring or circlips mounted in an interior groove of the skirt of the nut.

BRIEF DESCRIPTION OF THE DRAWINGS

The invention will be better understood and other details, features and advantages of the invention will appear when reading the following description provided by way of a non-restricted example in reference to the annexed drawings wherein:

FIG. 1 is a perspective view of a device for fastening according to the invention;

FIG. 2 is a view corresponding to FIG. 1, with a partial cross-section;

DETAILED DESCRIPTION

Figure 6:
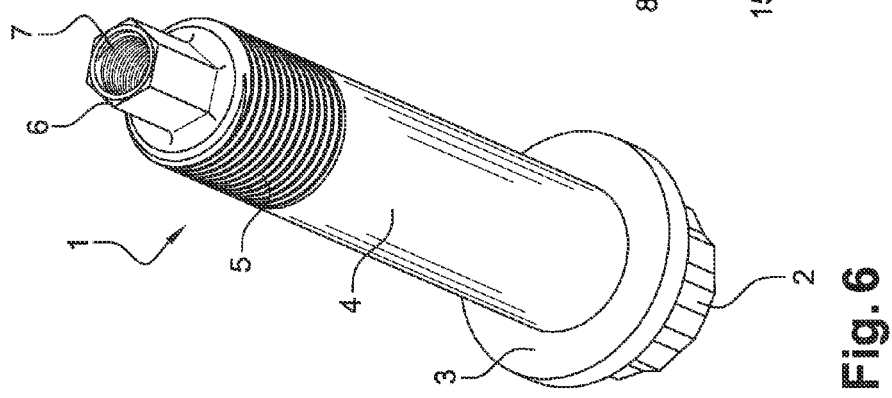
FIG. 6 is a perspective view of a screw of the device for fastening.

An embodiment of a device for fastening is shown in FIGS. 1 to 5. This device comprises a screw 1, which can be seen better in FIG. 6, comprising a head 2 provided with a flange 3, from which extends a cylindrical rod 4 of which only the end 5 is threaded.

The end of the rod is extended by a portion 6 of reduced and hexagonal section, having a threaded hole 7 in the center thereof, intended for assembling another screw (not shown).

Figure 7:
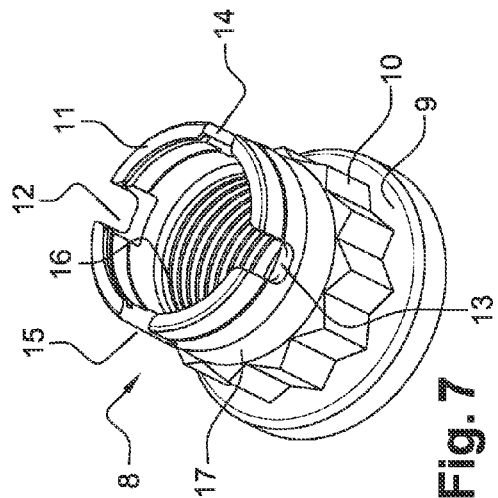
FIG. 7 is a perspective view of a nut of the device for fastening.
Figure 8:
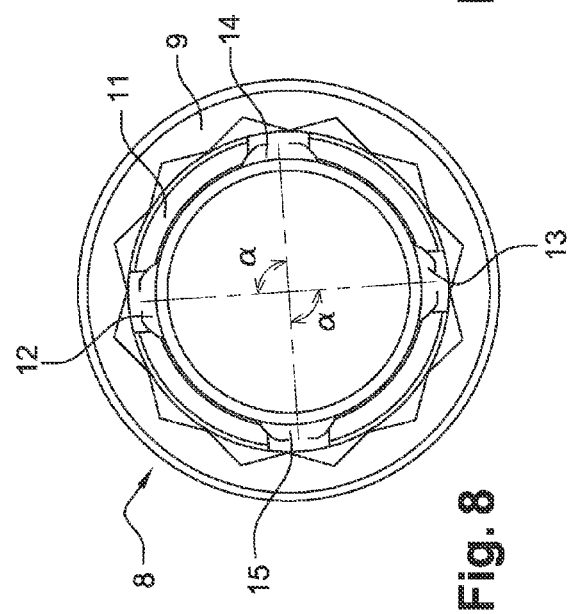
FIG. 8 is a top view of the nut.

A nut 8 is screwed onto the threaded end 5 of the screw 1, this nut 8 comprising a widened base 9, a zone of a star or bi-hexagonal section used for the tightening of the nut, and a skirt 11 of cylindrical shape extending axially and wherein are arranged two pairs of notches 12 to 15 (see FIGS. 7 and 8). The notches 12, 13 and 14, 15 of the same pair are diametrically opposite one another, with two successive notches being offset angularly by a non-orthogonal angle.

More precisely, the angular offset a between the notches 12 and 14 and that between the notches 13 and 15 is of a magnitude of 82.5°.

The internal wall of the nut comprises a threading 16 which extends inside the skirt 11 of which a zone is deformed in such a way as to have a shrunk section. This shrinking of the section is obtained here by crushing the skirt of the nut on an external groove 17 before screwing the nut 8 on the screw 1.

The shrinking of the section could also be obtained by carrying out a threading of tapered shape for example.

During the fastening or the assembling of two elements 18, 19, such as two elements of an aircraft, the nut 8 is screwed onto the screw 1, until the threaded end 5 of the screw 1 reaches the shrunk zone of the skirt of the nut 8. The tightening torque must then be increased in order to deform the skirt of the nut 8 by forcing. This deformation forms a brake that opposes the unscrewing of the nut 8.

After screwing, an intermediary ring 20 is mounted between the skirt 11 of the nut 8 and the hexagonal end 6 of the screw 1.

Figure 3:
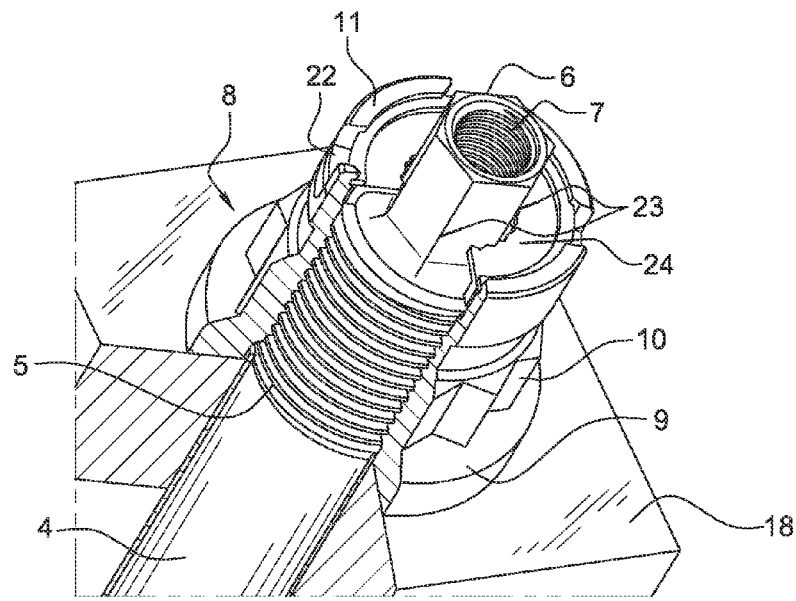
FIG. 3 is an enlarged view of FIG. 2.
Figure 4:
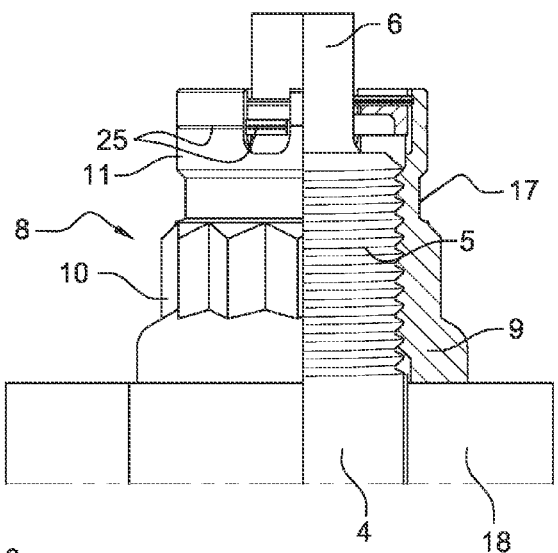
FIG. 4 is a front and partial cross-section view, of a portion of the device for fastening.
Figure 5:
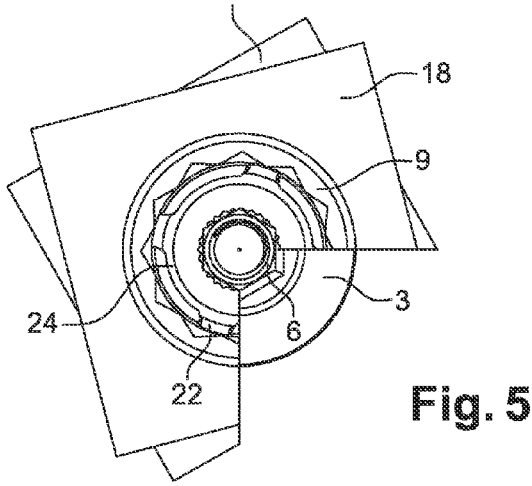
FIG. 5 is a top and partial cross-section view, of the device for fastening according to the invention.
Figure 9:
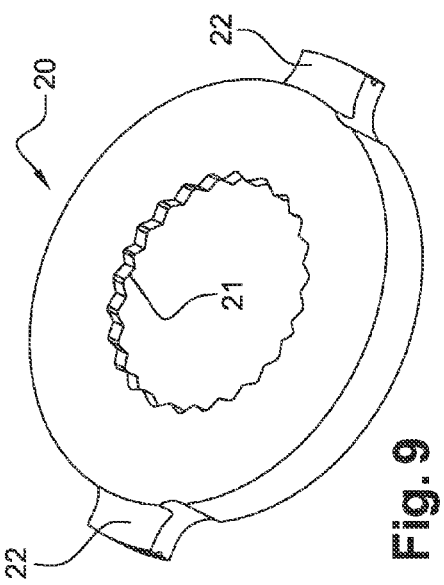
FIG. 9 is a perspective view of an intermediary ring of the device for fastening.

As shown in FIG. 9, this ring 20 comprises a radially internal edge provided with eighty teeth or catches 21, and an external edge comprising two lugs 22 extending radially towards the exterior and diametrically opposite. The lugs 22 extend in an axially offset plane in relation to the face of the ring 20 comprising the teeth or catches 21.

The teeth 21 are intended to engage on means for stopping in rotation such as the protruding ridges 23 (FIG. 3) formed by the hexagonal end 6 of the screw 1 and the lugs 22 are intended to be inserted into one of the pairs of notches 12, 13 and 14, 15 of the skirt of the nut 8, in such a way as to torque the nut 8 and the screw 1 in rotation, by the intermediary of the ring 20.

The position of the ring 20 depends on the angular position of the screw 1 in relation to the nut 8 after screwing.

The number of teeth or catches 21, the angular offset a between the notches 12 to 15 and the assembly clearance between the ring 20 on the one hand and the skirt 11 of the nut 8 or the screw 1 on the other hand, make possible the assembly of the ring 20 regardless of the angular position of the nut 8 in relation to the screw 1, Indeed, the notches 12, 14 and 13, 15 are offset angularly in relation to one another by a value a corresponding to an integer of pitches between two teeth 21 or between two catches 21 (pitch of 15°), increased by approximately one half pitch (7.5°). Furthermore, the aforementioned clearances make it possible to absorb angular offsets less than one half pitch, or 7.5°.

As such, in practice, an operator will choose to position the lugs 22 in one or the other of the pairs of notches 12 to 15, according to the angular position of the nut 8 in relation to the screw 1.

Alternatively, the skirt 11 of the nut 8 can comprise three pairs of notches, respectively a first and a second pairs of notches offset angularly in relation to one another by a value corresponding to an integer of pitches between two teeth 21 or between two catches 21, increased by approximately one half pitch, and a third pair of notches offset angularly from the first pair of notches by a value corresponding to an integer of pitches between two teeth 21 or between two catches 21, increased by approximately a quarter of a pitch (3.25°) or by three-quarters of a pitch.

Figure 10:
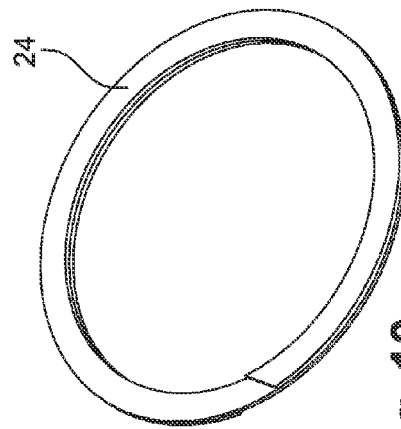
FIG. 10 is a perspective view of an elastic ring of the device for fastening.

The ring 20 is maintained axially inside the skirt 11 using a split elastic ring or circlips 24 (FIG. 10) mounted interiorly in a groove of the skirt 11 of the nut 8.

The axial position of the ring 20, according in particular to the depth of the notches 12 to 15 and to the geometry of the lugs 22, is determined in such a way as to allow a clearance (FIG. 4) between the end of the threaded portion 5 and the lower surface of the ring 20, in such a way as to be able to offset the fact that the length of the screw 1 must be selected from among a range of existing lengths. Indeed, in theory, the length of the smooth portion 4 of the screw 1 corresponds substantially to the cumulative thicknesses of the elements 18 and 19. In practice, a screw is chosen from an available range, of which the length of the smooth portion is as close as possible to the theoretical length.

The nut and the ends of the lugs 22 can comprise marks 25 (FIG. 4) making it possible to ensure the proper assembly of the ring 20. Indeed, as the plane of the lugs 22 is offset in relation to the plane of the teeth 21 of the ring 20, it is suitable to ensure that the marks 25 are aligned with each other when the ring 20 is pressing axially against the circlips 24. If such is the case, the ring 20 is correctly positioned.

Alternatively, the ring 20 could have a symmetrical structure. In such a case, the marks 25 would no longer be of use and could be suppressed.

The device for fastening according to the invention makes it possible to render integral in rotation the nut 8 and the screw 1, in a simple and sure manner, in such a way as to prevent the accidental loosening of the nut 8. This device for fastening can be used in the aeronautics field, but also in the automobile field, industrial field, or in any other field requiring a reliable and sure fastening.

The invention claimed is:

1. Device for fastening comprising:
   a threaded rod;
   a nut that can be screwed on the rod; and
   means for locking the nut in rotation in relation to the threaded rod comprising an intermediary ring mounted between the nut and an end of the threaded rod, this ring comprising rotational coupling means with the end of the threaded rod and rotational coupling means with the nut, wherein the nut comprises a thinned portion which is elastically deformable to tightening during the screwing on the threaded rod, and wherein the intermediary ring is assembled and immobilized in rotation in said thinned portion by the rotational coupling means with the end of the threaded rod and the rotational coupling means with the nut.

2. Device according to claim 1, wherein the end of the threaded rod comprises at least one longitudinal protruding ridge, the radially internal edge of the ring being provided with a plurality of teeth or catches that can engage with this longitudinal ridge and defining a plurality of angular positions of the ring around the end of the threaded rod.

3. Device according to claim 2, wherein the end of the threaded rod is an axial rod of reduced diameter, with polygonal external section.

4. Device according to claim 1, wherein the radially external edge of the ring comprises at least one lug extending radially towards the exterior, that can engage in at least one notch of a skirt of the nut.

5. Device according to claim 4, wherein the radially external edge of the ring comprises at least two radial lugs extending diametrically opposite one another.

6. Device according to claim 1, wherein the thinned portion of the nut is a cylindrical skirt which extends axially from the nut.

7. Device according to claim 2 wherein the radially external edge of the ring comprises at least one lug extending radially towards the exterior, that can engage in at least one notch of a skirt of the nut, the thinned portion of the nut is a cylindrical skirt which extends axially from the nut, and the skirt of the nut comprises at least two notches offset angularly in relation to one another by a value ($\alpha$) corresponding to an integer of pitches between two teeth or between two catches, increased by approximately one half pitch.

8. Device according to claim 7, wherein the nut comprises at least three notches, respectively a first notch and a second notch offset angularly in relation to one another by a value corresponding to an integer of pitches between two teeth or between two catches, increased by approximately one half pitch, and a third notch offset angularly from the first notch by a value corresponding to an integer of pitches between two teeth or between two catches, increased by approximately a quarter of a pitch or by three-quarters of a pitch.

9. Device according to claim 1, wherein the rotational coupling means with the nut and/or the rotational coupling means with the threaded rod have an assembly clearance authorizing the assembly of the ring between the nut and the threaded rod, regardless of their positions.

10. Device according to claim 6, wherein the device comprises means of axial retention of the ring inside the skirt.

11. Device according to claim 10, wherein the means of axial retaining comprising a split elastic ring or circlips assembled in an interior groove of the skirt of the nut.

* * * * *